US008578053B2

(12) United States Patent
Shinkai

(10) Patent No.: US 8,578,053 B2
(45) Date of Patent: Nov. 5, 2013

(54) NAS LOAD BALANCING SYSTEM

(75) Inventor: Yoshitake Shinkai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 894 days.

(21) Appl. No.: 11/114,217

(22) Filed: Apr. 26, 2005

(65) Prior Publication Data
US 2005/0223096 A1 Oct. 6, 2005

Related U.S. Application Data

(63) Continuation of application No. PCT/JP02/12787, filed on Dec. 5, 2002.

(51) Int. Cl.
*G06F 15/173* (2006.01)
*G06F 15/16* (2006.01)

(52) U.S. Cl.
USPC ........... 709/242; 709/219; 709/238; 709/239; 709/240; 709/244; 709/225

(58) Field of Classification Search
USPC .................................................. 709/225, 242
See application file for complete search history.

(56) References Cited

U.S. PATENT DOCUMENTS

| | | | | |
|---|---|---|---|---|
| 5,774,660 A * | 6/1998 | Brendel et al. | | 709/201 |
| 6,317,775 B1 * | 11/2001 | Coile et al. | | 709/201 |
| 6,389,448 B1 * | 5/2002 | Primak et al. | | 718/105 |
| 6,760,775 B1 * | 7/2004 | Anerousis et al. | | 709/238 |
| 6,779,119 B1 * | 8/2004 | Moshfeghi et al. | | 726/23 |
| 2003/0018927 A1 * | 1/2003 | Gadir et al. | | 714/4 |
| 2003/0056002 A1 * | 3/2003 | Trethewey | | 709/238 |
| 2003/0101275 A1 * | 5/2003 | Maciel | | 709/235 |
| 2004/0103194 A1 * | 5/2004 | Islam et al. | | 709/225 |
| 2004/0255037 A1 * | 12/2004 | Corvari et al. | | 709/229 |

FOREIGN PATENT DOCUMENTS

| | | |
|---|---|---|
| JP | 10-27148 | 1/1998 |
| JP | 10-307783 | 11/1998 |
| JP | 2002-259354 | 9/2002 |
| JP | 2002-305532 | 10/2002 |

OTHER PUBLICATIONS

Yoshitake Shinkai, et al., "Cluster File System: HAMFS", FUJITSU vol. 50, No. 4, pp. 210-214. (Jul. 1999).
Web Server no Fuka Bunsan Tool URL Switch ya Session Kanri ni Taio, EC Site ya Intranet ni Donyo Susumu, Nikkei Internet Technology, Apr. 2004, pp. 142-151.

* cited by examiner

*Primary Examiner* — Noel Beharry
(74) *Attorney, Agent, or Firm* — Fujitsu Patent Center

(57) ABSTRACT

A NAS load balancing system for distributing NAS loads of a NAS unit including a plurality of nodes and accessed via a network by multiple NAS clients is disclosed. In the NAS load balancing system, the NAS unit has multiple virtual IP addresses.

8 Claims, 7 Drawing Sheets

NAS LOAD BALANCING SYSTEM

CROSS-REFERENCE TO RELATED APPLICATION

The present application is a U.S. continuation application filed under 35 U.S.C. 111(a) claiming benefit under 35 U.S.C. 120 and 365(c) of a PCT International Application No. PCT/JP2002/012787, filed on Dec. 5, 2002, the entire contents of which are hereby incorporated by reference.

BACKGROUND OF THE INVENTION

1. Field of the Invention

The present invention relates generally to NAS (network attached storage) load (work load) balancing systems, and more particularly to a technique for constructing a NAS system capable of sharing loads between composing nodes and thereby improving operability and performance by automatically routing a request issued from a NAS client to an appropriate node, considering the file access locality of the NAS client, in a NAS unit composed of multiple nodes such as computers and designed so that the same file can be accessed from any node.

2. Description of the Related Art

FIG. 1 is a schematic diagram illustrating a conventional NAS system in which a conventional NAS unit 1000 and a NAS client group are connected via a network 110 such as an IP network. Referring to FIG. 1, the NAS system includes the NAS unit 1000, the network 110, and computers 111, 112, and 113 forming the NAS client group.

The NAS unit 1000 includes a storage unit 104, multiple nodes 1010, 1020, and 1030, and a dispatcher unit 105. The dispatcher unit 105 is known as a method of distributing loads among the nodes 1010, 1020, and 1030.

According to this method, one logical IP address (LIP1) is defined for the NAS unit 1000, and each of the computers (NAS clients) 111, 112, and 113 issues a file operation request to this logical IP address. As described above, the dedicated computer called "dispatcher unit 105," which is a special apparatus managing IP address conversion, is provided in the NAS unit 1000. The dispatcher unit 105 converts the logical IP address, which is the destination of the request issued by the NAS client 111, 112, or 113, into a unique physical IP address (MAC1, MAC2, or MAC3) determined node by node in the NAS unit 1000. As a result, the dispatcher unit 105 routes the request to the destination node.

This conventional method can provide access that can make the internal node configuration of the NAS unit 1000 transparent to the NAS clients 111 through 113, but increases the cost of the NAS unit 1000. Further, there is a disadvantage in performance in that overhead accompanying IP address conversion affects the throughput of the NAS unit 1000. For instance, there is a problem in that if the requests from the NAS clients 111 through 113 reach the NAS unit 1000 at such a frequency as to exceed the processing capacity of the dispatcher unit 105, the throughput of the NAS unit 1000 cannot be increased with scalability no matter how many nodes the NAS unit 1000 has.

FIG. 2 is a schematic diagram illustrating a conventional NAS system where the conventional NAS unit 1000 and the NAS client group are connected via the network 110 without employment of the dispatcher unit 105 of FIG. 1. In FIG. 2, the same elements as those of FIG. 1 are referred to by the same numerals.

Referring to FIG. 2, the NAS unit 1000 includes the multiple nodes 1010, 1020, and 1030 and the storage unit 104. The nodes 1010, 1020, and 1030 have their own IP addresses (IP1, IP2, and IP3, respectively). When the computers 111 through 113 forming the NAS client group access the NAS unit 1000, each of the NAS clients (computers) 111 through 113 uses any fixed one of the IP addresses (IP1, IP2, and IP3) assigned to the nodes 1010 through 103 so as to always access the storage unit 104 in the NAS unit 1000 via the same single node. For instance, the NAS client 111 always accesses the storage unit 104 via the node 1010, the NAS client 112 always accesses the storage unit 104 via the node 1020, and the NAS client 113 always accesses the storage unit 104 via the node 1030.

However, there is a problem in that when each of the NAS clients 111 through 113 always accesses the storage unit 104 via the same node in the NAS unit 1000, loads cannot be balanced among the nodes 1010, 1020, and 1030.

SUMMARY OF THE INVENTION

Accordingly, it is a general object of the present invention to provide a NAS load balancing system in which the above-described disadvantages are eliminated.

A more specific object of the present invention is to provide a NAS load balancing system capable of distributing loads between composing nodes by automatically routing a request issued from a NAS client to an appropriate node without having a dispatcher unit in a NAS unit composed of multiple nodes.

The above objects of the present invention are achieved by a NAS load balancing system for distributing NAS loads of a NAS unit including a plurality of nodes and accessed via a network by multiple NAS clients, wherein the NAS unit has a plurality of virtual IP addresses.

According to one aspect of the present invention, a request issued from a NAS client is automatically routed to an appropriate node, so that loads can be balanced between composing nodes without employment of a dispatcher unit.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention.

Figure 1:
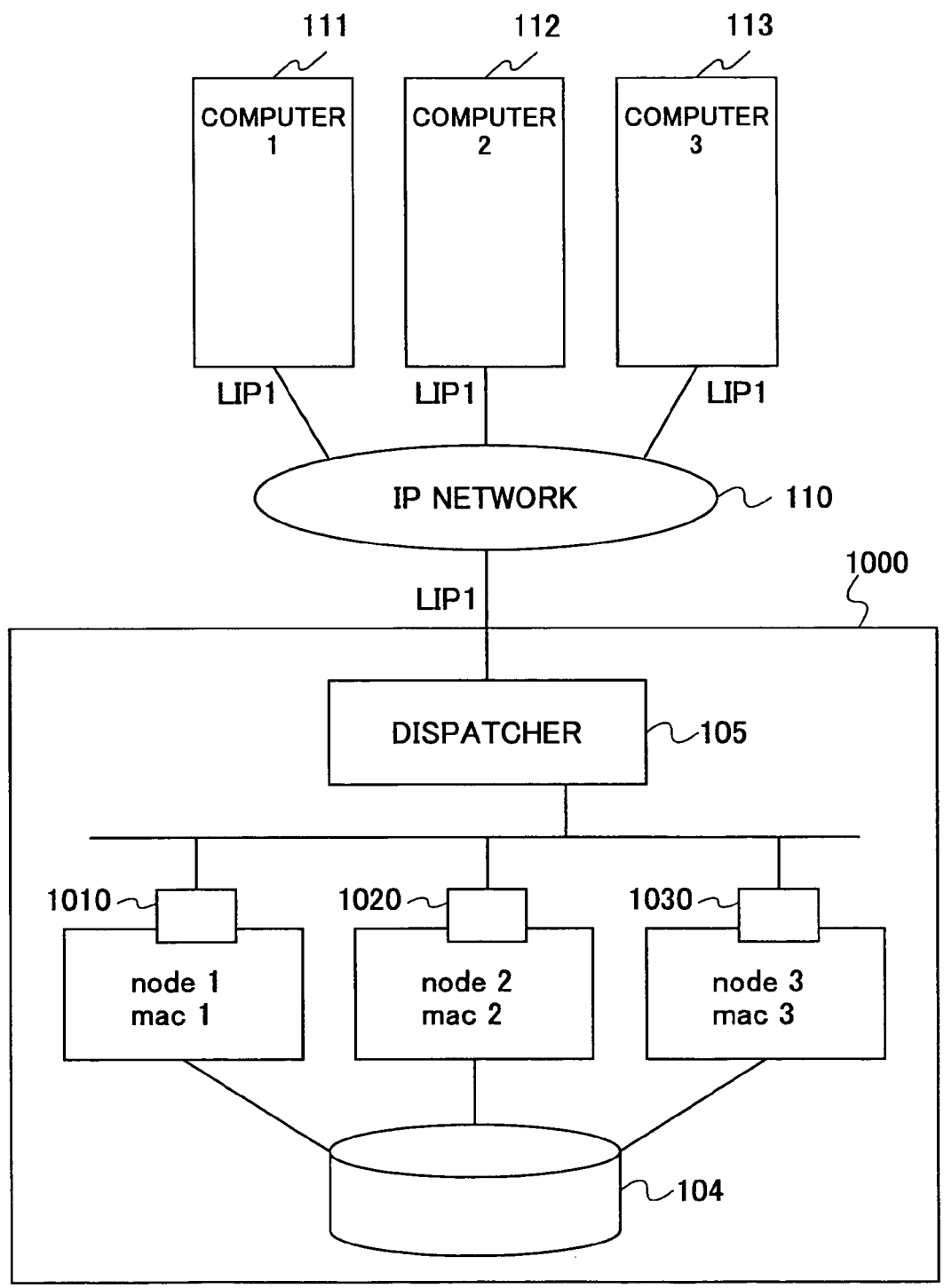
FIG. 1 is a schematic diagram illustrating a conventional NAS system in which a conventional NAS unit and a NAS client group are connected via a network.
Figure 2:
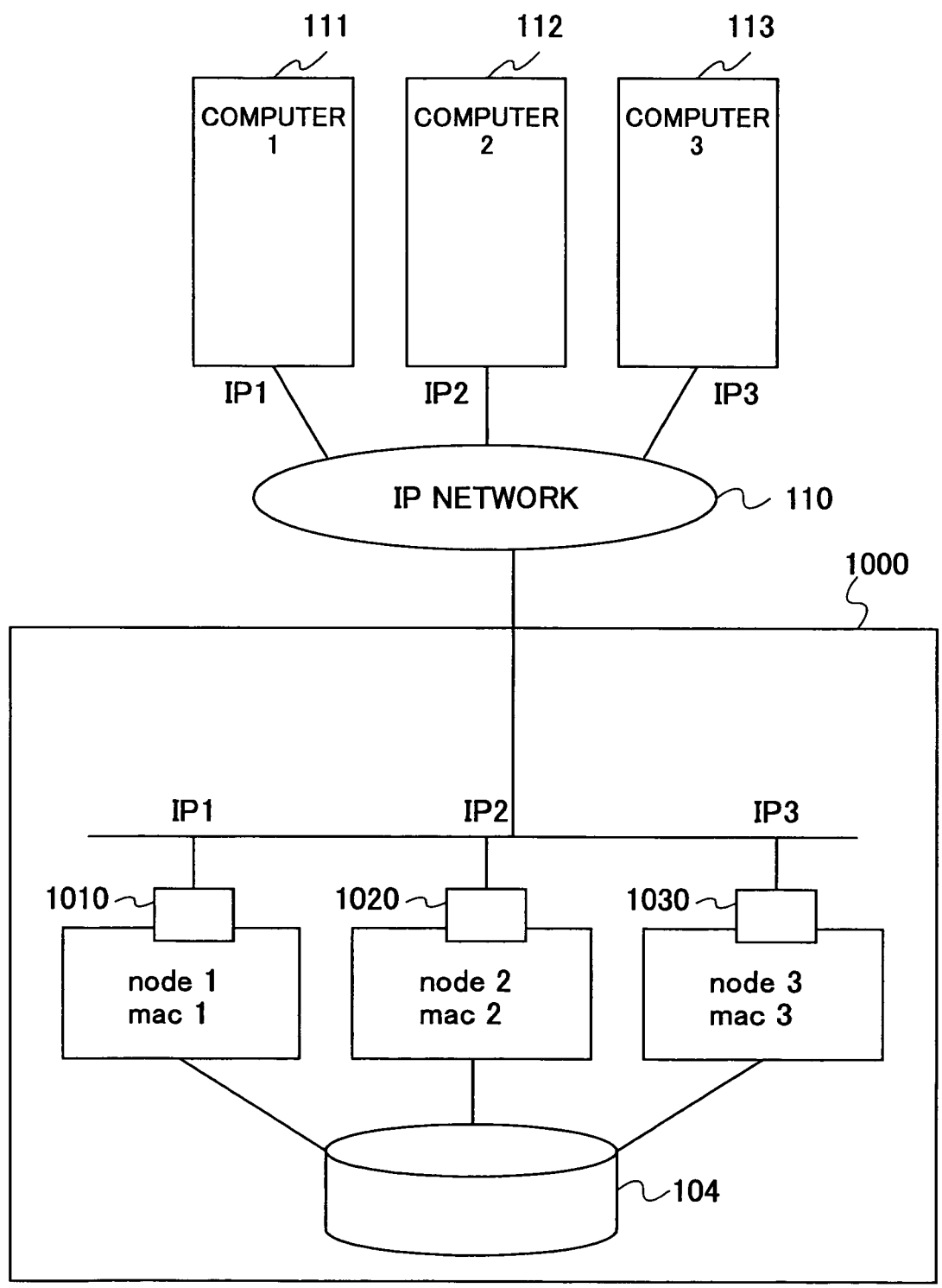
FIG. 2 is a schematic diagram illustrating another conventional NAS system where the conventional NAS unit and the NAS client group are connected via the network without employment of a dispatcher unit in the NAS unit.
Figure 3:
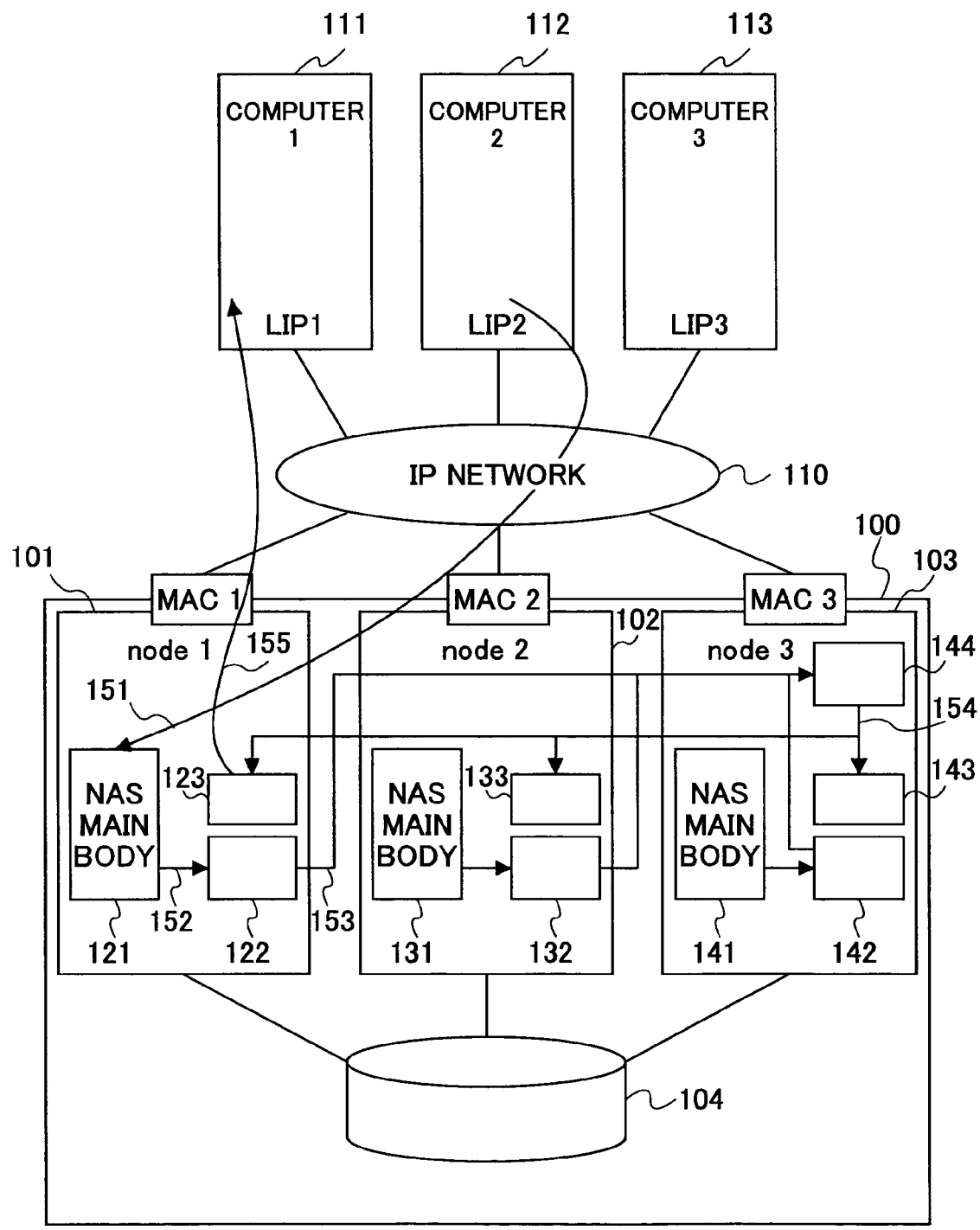
FIG. 3 is a schematic diagram illustrating a NAS system in which a NAS unit and the NAS client group are connected via the network according to an embodiment of the present invention.

FIG. 3 is a schematic diagram illustrating a NAS system in which a NAS unit 100 and the NAS clients 111, 112, and 113 forming a NAS client group are connected via the network 110 according to the embodiment of the present invention. The NAS clients 111 through 113 forming a NAS client group are computers sharing the NAS unit 100.

The NAS unit 100 includes multiple nodes 101, 102, and 103 and the storage unit 104. The nodes 101 through 103 include NAS main bodies 121, 131, and 141, respectively; statistical data collectors 122, 132, and 142, respectively; and destination changers 123, 133, and 143, respectively. The node 103 further includes a real IP determinator (a physical IP address determinator) 144.

An overview is given of the operation of each element.

First, a description is given of the NAS clients 111 through 113 forming a NAS client group.

Each of the NAS clients 111 through 113 includes a widely used general computer and an existing program operable on the computer. Each of the NAS clients 111 through 113 is assigned a logical IP address LIP-x (x is a number determined NAS client by NAS client) that is the representative IP address of the NAS unit 100 to the corresponding computer (NAS client). In the case of FIG. 3, the NAS clients 111, 112, and 113 are assigned LIP1, LIP2, and LIP3, respectively.

When the NAS clients 111 through 113 access the NAS unit 100, the NAS clients 111 through 113 transmit a request to their respective logical IP addresses. For instance, this transmission of the request is indicated by reference numeral 151 in FIG. 3. Each logical IP address corresponds to one of the MAC or physical addresses (MAC1, MAC2, and MAC3) of the nodes 101, 102, and 103 of the NAS unit 100. The request from each of the NAS clients 111 through 113 is transmitted to one of the nodes 101 through 103 having the MAC address corresponding to its logical IP address. The logical IP addresses and the corresponding MAC addresses are correlated in the same manner as by a well-known mechanism for correlating real IP addresses with MAC addresses.

Next, a description is given of the NAS main bodies 121, 131, and 141 of the nodes 101, 102, and 103, respectively, in the NAS unit 100.

The NAS main bodies 121, 131, and 141 are programs for processing a file operation request transmitted from the NAS client 111, 112, or 113. If the nodes 101, 102, and 103 of the NAS unit 100 have a symmetric configuration, there is no difference between the nodes 101, 102, and 103 of the NAS unit 100. Accordingly, with respect to any file, the NAS client 111, 112, or 113 can process the file at the same cost via any of the nodes 101, 102, and 103.

On the other hand, if the nodes 101, 102, and 103 of the NAS unit 100 have an asymmetric configuration, the cost differs between the nodes 101, 102, and 103, depending on a file to be processed. A predetermined group of files can be processed at a minimum cost while an extra cost is required for the other files, depending on which of the nodes 101, 102, and 103 to go through to access the NAS unit 100. In this case, the number of a node that enables processing at a minimum cost (a primary node number) is recorded for each file in metadata. The present invention is adjusted to be applicable in either one of the above-described characteristics of the underlying file system.

Next, a description is given of the statistical data collectors 122, 132, and 142 of the nodes 101, 102, and 103, respectively, in the NAS unit 100. The statistical data collectors 122, 132, and 142 accumulate performance data reported from the NAS main bodies 121, 131, and 141, respectively, and store statistical data logical IP address by logical IP address. For instance, this data reporting is indicated by reference numeral 152 in FIG. 3. The statistical data collectors 122, 132, and 142 transmit the results of the accumulated statistical data to the real IP determinator 144 provided in the node 103 at regular time intervals.

Next, a description is given of the real IP determinator 144 provided in the node 103. The real IP determinator 144 of the node 103 further aggregates the statistical data transmitted from the statistical data collectors 122, 132, and 142 in the nodes 101, 102, and 103, respectively, of the NAS unit 100. For instance, this data transmission is indicated by reference numeral 153 in FIG. 3. Then, the real IP determinator 144 creates a "logical IP address-real IP address conversion table" showing an optimum logical IP address-real IP address correspondence in accordance with, for instance, a below-described algorithm at regular time intervals, and transmits the created table to the destination changers 123, 133, and 143 of the nodes 101, 102, and 103, respectively, in the NAS unit 100. For instance, this transmission is indicated by reference numeral 154 in FIG. 3.

Next, a description is given of the destination changers 123, 133, and 143 of the nodes 101, 102, and 103, respectively, in the NAS unit 100. Each of the destination changers 123, 133, and 143 changes the destination of the logical IP address in accordance with the optimum "logical IP address-real IP address conversion table" transmitted from the real IP determinator 144 provided in the node 103. For instance, this changing of the destination is indicated by reference numeral 155 in FIG. 3.

Next, a detailed description is given, with reference to FIGS. 4 through 7, of the operational algorithms of the NAS main bodies 121, 131, and 141, the statistical data collectors 122, 132, and 142, and the destination changers 123, 133, and 143 of the nodes 101, 102, and 103, respectively, in the NAS unit 100, and the operational algorithm of the real IP determinator 144 of the node 103.

Figure 4:
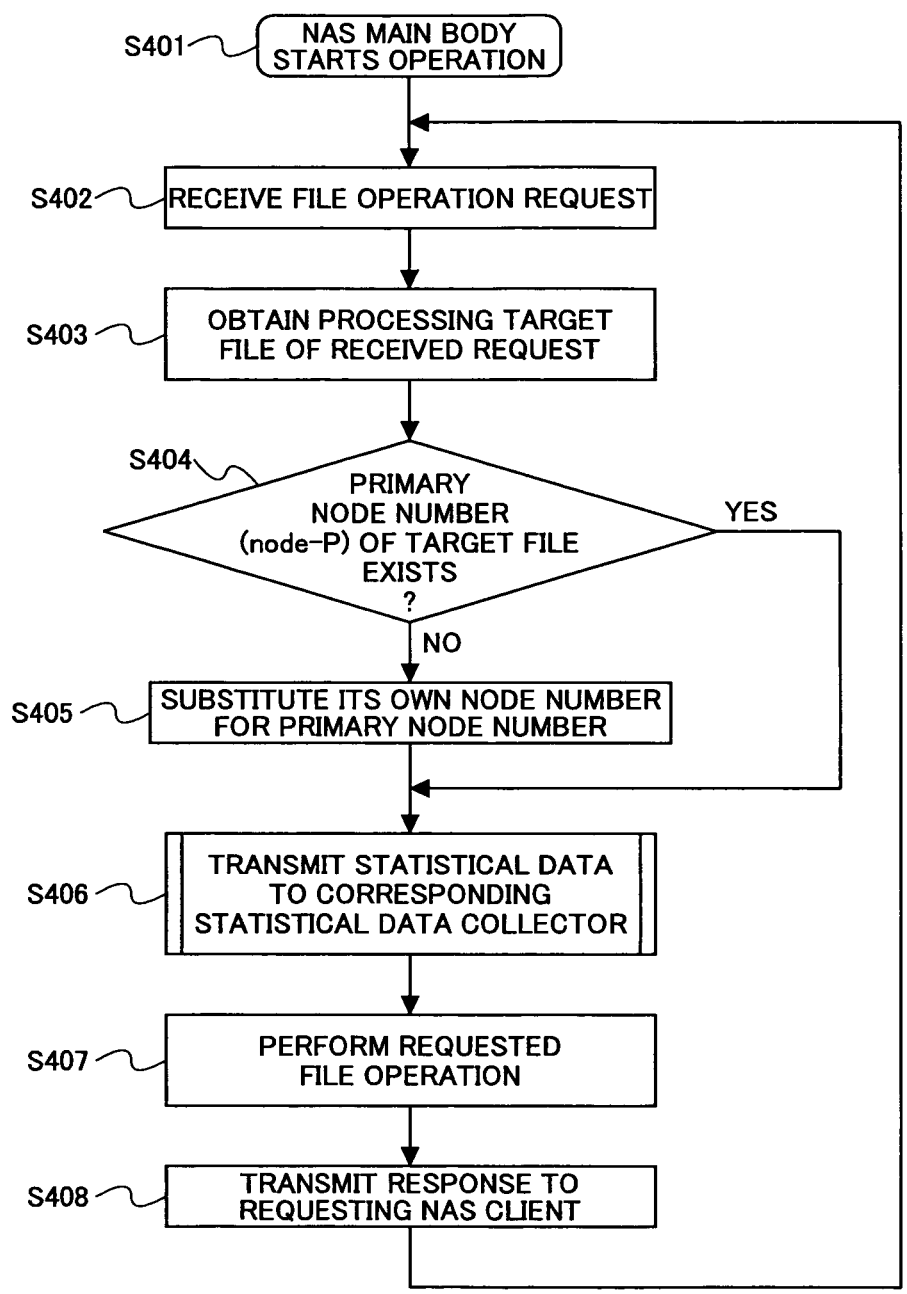
FIG. 4 is a flowchart illustrating an operational algorithm of a NAS main body of the NAS unit according to the embodiment of the present invention.

First, a description is given of an operation of the NAS main bodies 121, 131, and 141. FIG. 4 is a flowchart illustrating an operational algorithm of the NAS main bodies 121, 131, and 141.

Referring to the algorithm of FIG. 4, in step S401, the NAS main bodies 121, 131, and 141 start operations.

Next, in step S402, for instance, the NAS main body 121 receives a file operation request from one of the NAS clients 111, 112, and 113 via the network 110. For instance, in FIG. 3, the NAS main body 121 receives a file operation request from the NAS client 112 via the network 110.

Next, in step S403, each of the NAS main bodies 121, 131, and 141 obtains a file that is a target of processing of the received request (a target file) based on the received request.

Next, in step S404, it is checked whether the primary node (node-P) of the target file exists. The primary node refers to an optimum processing node for the unit of a file whose processing cost is the lowest in the case of an asymmetric-type NAS unit as described above. If the primary node number (node-P) of the target file does not exist, step S405 is entered. If the primary node number (node-P) of the target file exists, step S406 is entered.

Next, in step S405, the NAS main body (121, 131, or 141) substitutes its own node number for the primary node number (node-P).

Next, in step S406, the NAS main bodies 121, 131, and 141 transmit collected statistical data to the corresponding statistical data collectors 122, 132, and 142. The collected statistical data includes the logical IP address of a destination from a NAS client, the IP address of the requesting NAS client, and the primary node number (or the node number of a node receiving a request in the case of a symmetrical-type NAS unit).

Next, in step S407, the NAS main bodies 121, 131, and 141 perform file operations requested of the corresponding nodes 101, 102, and 103 by the NAS clients.

Finally, in step S408, the NAS main bodies 121, 131, and 141 transmit, to the corresponding requesting NAS clients, responses to the file operation requests therefrom. Thereafter, each of the NAS main bodies 121, 131, and 141 awaits a file operation request in order to receive a request from the next NAS client.

Figure 5:
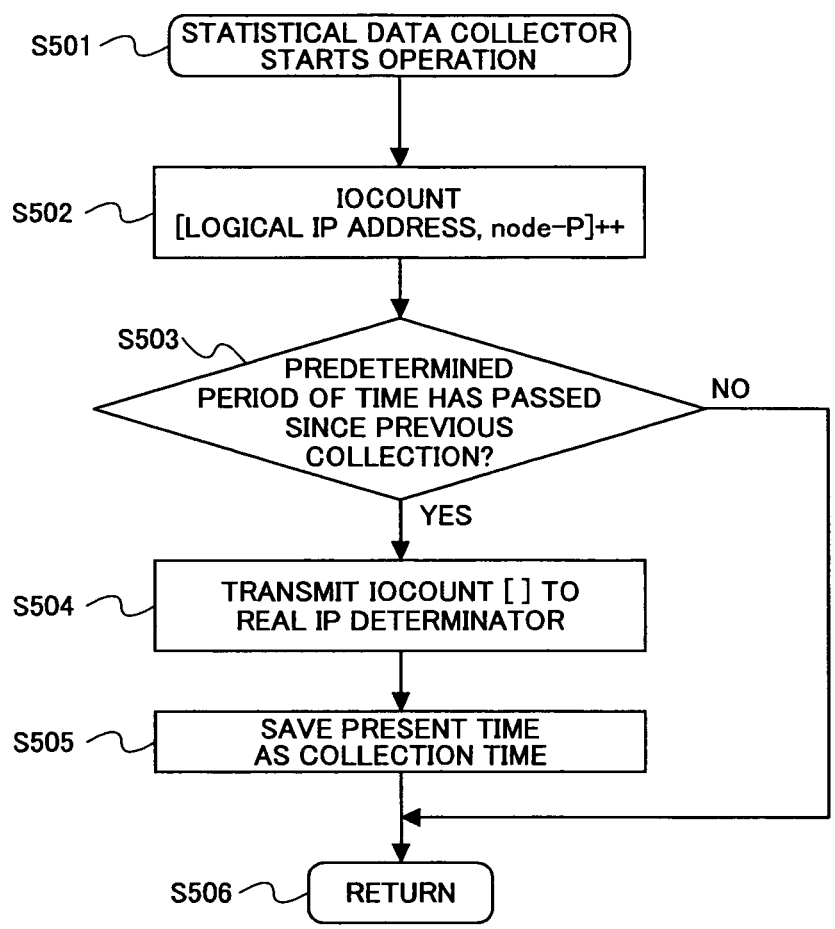
FIG. 5 is a flowchart illustrating an operational algorithm of a statistical data collector of the NAS unit according to the embodiment of the present invention.

Next, a description is given of an operation of the statistical data collectors 122, 132, and 142. FIG. 5 is a flowchart illustrating an operational algorithm of the statistical data collectors 122, 132, and 142.

Referring to the algorithm of FIG. 5, in step S501, the statistical data collectors 122, 132, and 142 start operations.

Next, in step S502, each of the statistical data collectors 122, 132, and 142 stores statistical data transmitted from the corresponding NAS main body (121, 131, or 141) logical IP address by logical IP address and primary node number (node-P) by primary node number. That is, each of the statistical data collectors 122, 132, and 142 stores the number of file operation requests as statistical data logical IP address by logical IP address and primary node number (node-P) by primary node number. At the same time, each of the statistical data collectors 122, 132, and 142 stores the total number of file operations requests as statistical data.

Next, in step S503, it is checked whether a predetermined period of time has passed since transmission of previously collected statistical data to the real IP determinator 144 provided in the node 103. If the predetermined period of time has not passed, step S506 is entered and the operation ends. If the predetermined period of time has passed, step S504 is entered.

In step S504, currently collected statistical data is transmitted to the real IP determinator 144 provided in the node 103.

Next, in step S505, a present time at which the currently collected statistical data is transmitted to the real IP determinator 144 provided in the node 103 is saved as a new collection time of statistical data for the next invocation.

Then, in step S506, the operation ends.

Figure 6:
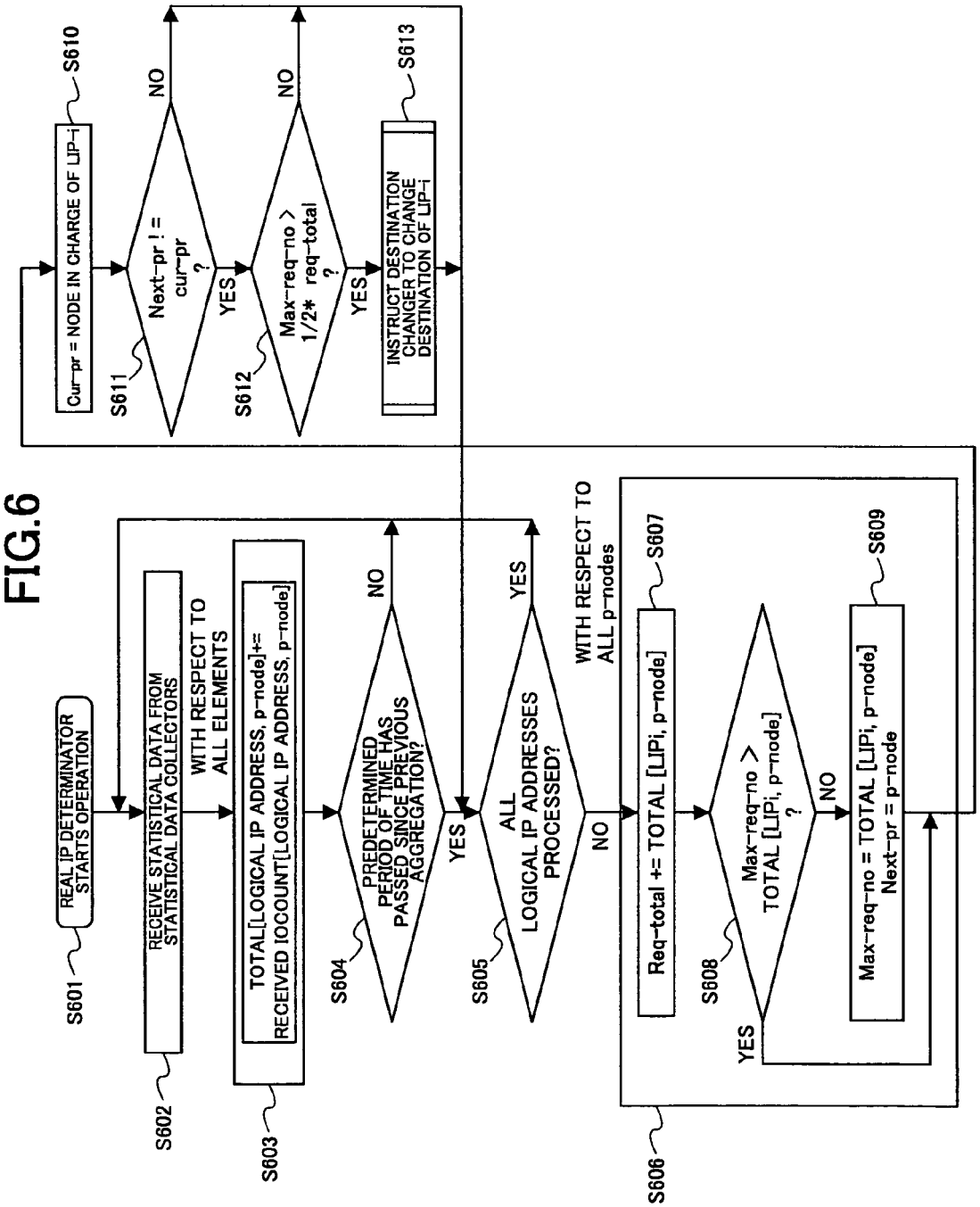
FIG. 6 is a flowchart illustrating an operational algorithm of a real IP determinator of the NAS unit according to the embodiment of the present invention.

Next, a description is given of an operation of the real IP determinator 144. FIG. 6 is a flowchart illustrating an operational algorithm of the real IP determinator 144. In this embodiment, the following description of the algorithm is given of the case of an asymmetric-type NAS unit in particular. According to this algorithm, the statistical data transmitted from the statistical data collectors 122, 132, and 142 of the nodes 101, 102, and 103, respectively, are further aggregated, and an optimum "logical IP address-real IP address conversion table" is created at regular time intervals and transferred to the destination changers 123, 133, and 143, respectively, of the nodes 101, 102, and 103.

Referring to the algorithm of FIG. 6, in step S601, the real IP determinator 144 starts operation.

Next, in step S602, the real IP determinator 144 receives the statistical data described with reference to FIG. 5 from the statistical data collectors 122, 132, and 142 of the nodes 101, 102, and 103, respectively, in the NAS unit 100.

Next, in step S603, the real IP determinator 144 obtains the total number of requests to the destination logical IP address by logical IP address and primary node number (node-P) by primary node number.

Next, in step S604, it is checked whether a predetermined period of time has passed since a previous aggregation. If the predetermined period of time has not passed since the previous aggregation, the operation returns to step S602 so that the real IP determinator 144 continues to receive the statistical data. Meanwhile, if the predetermined period of time has passed since the previous aggregation, step S605 is entered.

Next, in step S605, it is checked whether processing is completed with respect to all the logical IP addresses. If the processing is completed with respect to all the logical IP addresses, the operation returns to step S602 so that the real IP determinator 144 continues to receive the statistical data. Meanwhile, if there is an unprocessed logical IP address, step S606 is entered so that the processing continues on the unprocessed logical IP address.

Step S606 includes steps S607, S608, and S609.

In step S607, the total number of requests to the logical IP address (LIP-i) is accumulated over all primary nodes and determined as "req-total."

Next, in steps S608 and S609, a primary node number (next-pr) that has received the largest number of the requests to the logical IP address (LIP-i), and the corresponding number of requests (max-req-no) are obtained. That is, in step S608, it is checked whether a condition (max-req-no>TOTAL [LIPi, p-node]) holds. If the condition (max-req-no>TOTAL [LIPi, p-node]) holds, the operation proceeds to step S610. On the other hand, if the condition does not hold, the operation proceeds to step S609.

In step S609, a candidate for the destination (next-pr) of the logical IP address (LIP-i) is determined. At the same time, the maximum number of requests (max-req-no) is determined as the total value of the requests to this primary node TOTAL [LIPi, p-node].

Next, in step S610, cur-pr is determined as the node (LIP-i) to which the logical IP address is currently assigned.

Next, in step S611, it is checked whether the two primary node numbers cur-pr and next-pr are not equal. If cur-pr and next-pr are equal, the operation proceeds to step S605. If cur-pr and next-pr are not equal, the operation proceeds to step S612.

Next, in step S612, it is checked whether (max-req-no>½*req-total) holds. If this condition does not hold, the operation proceeds to step S605. If this condition holds, the operation proceeds to step S613.

Next, in step S613, the real IP determinator 144 of the node 103 instructs the destination changer (123, 133, or 143) of the corresponding node 101, 102, or 103 to change the destination of the logical IP address (LIP-i) from the current primary node number cur-pr to the primary node number next-pr.

Then, the operation proceeds to step S605 so that the real IP determinator 144 continues to perform processing for the next logical IP address.

As described above, the description is given of the algorithm in the case of an asymmetrical-type NAS unit. On the other hand, in the case of a symmetric-type NAS unit, the number of requests is counted node by node. If there is a great difference between the counted numbers, "logical IP address-real IP address pairs" are set so as to approximately equalize the numbers of processing requests of the nodes, and are transmitted to the destination changers 123, 133, and 143.

In this example algorithm, an attempt is made to collect as many requests from the NAS clients 111 through 113 as possible to a node of a minimum processing cost for simplification of description. However, it is easy to modify the algorithm so that the processing loads of the nodes are equalized in consideration of the processing costs.

Figure 7:
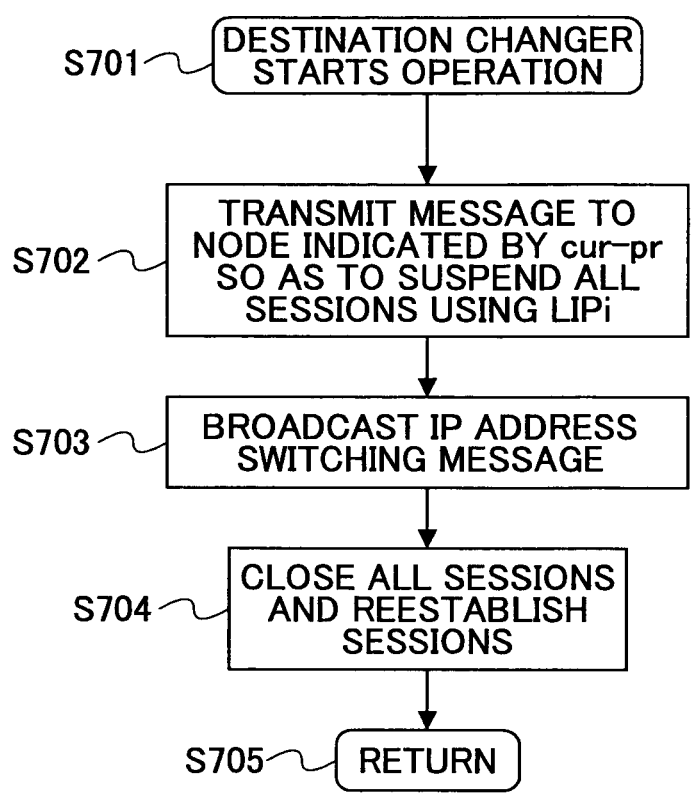
FIG. 7 is a flowchart illustrating an operational algorithm of a destination changer of the NAS unit according to the embodiment of the present invention.

Next, a description is given of an operation of the destination changers 123, 133, and 143. FIG. 7 is a flowchart illustrating an operational algorithm of the destination changers 123, 133, and 143.

Referring to the algorithm of FIG. 7, in step S701, the corresponding destination changer 123, 133, or 143 starts to change the destination of the logical IP address.

Next, in step S702, a message is transmitted to a node using cur-pr so as to temporarily suspend all sessions using the logical IP address (LIP-i). Here, the term "suspend" means to stack requests addressed to the logical IP address (LIP-i).

Next, in step S703, in order to switch the destination of the specified logical IP address LIP-i to a MAC address corresponding to next-pr, an IP switching message having a "MAC address-Lip-i pair" as an argument is transmitted to the network 110. Thereafter, an optimum "logical IP address-real IP address conversion table" after the change is transmitted to all of the NAS clients 111, 112, and 113, so that the corresponding NAS client is informed that the real IP address corresponding to the logical IP address has been changed. Thereafter, the NAS unit 100 can be accessed with this real IP address. However, the upper layer of the corresponding NAS client can still access the NAS unit 100 with the existing logical IP address.

This switching of the logical IP address may be performed using a well known method such as a method using gratuitous ARP (address resolution protocol). The gratuitous ARP is an ARP response in the case where there is no ARP request. That is, the gratuitous ARP is an ARP response that causes each host on a network to receive the ARP response and refresh an ARP cache when the ARP response is addressed to broadcast hardware addresses.

Next, in step S704, all sessions from all the corresponding NAS clients to LIP-i are closed. As a result, the temporarily suspended requests are discarded, and the corresponding NAS clients are notified that the sessions are disconnected. Each of the corresponding NAS clients reestablishes sessions to LIP-i and retransmits file operation requests when receiving this notification. Accordingly, the requests are directed to the new node next-pr from the corresponding NAS clients.

Finally, in step S705, the destination changer 123, 133, or 143 ends operation.

According to the embodiment of the present invention, a NAS unit includes a storage unit and multiple nodes. Each node includes a NAS main body, a statistical data collector, and a destination changer. One of the nodes further includes a real IP determinator.

The NAS main body processes a file operation request issued from a NAS client, and returns a response thereto.

The statistical data collector collects the statistics of the request issued from the NAS client with respect to each destination logical IP address. In the case of an asymmetrical-type NAS unit (a NAS unit of a type that has a processing node [primary node] attribute optimum for the unit of a file and whose processing cost increases when processing is performed by not a primary node but another node), the collection is performed primary node by primary node as well as logical IP address by logical IP address.

The real IP determinator evaluates the data collected by the statistical data collector at regular time intervals, and changes the destination retained by the NAS client through the destination changer.

The destination changer reports a real MAC address corresponding to the logical IP address of the NAS unit retained by the NAS client to the NAS client. As a result, the destination real IP address of requests issued by the NAS client is switched on the NAS client side without employment of special dispatching hardware.

According to one aspect of the present invention, a request issued from a NAS client is automatically routed to an appropriate node using the above-described configuration, so that loads can be balanced between composing nodes without employment of a dispatcher unit.

The present invention is not limited to the specifically disclosed embodiment, and variations and modifications may be made without departing from the scope of the present invention.

What is claimed is:

1. A storage load balancing system for distributing a storage load, the storage load balancing system comprising:
a plurality of clients each mapped to a logical IP address different from logical IP addresses of other clients;
a storage unit including a plurality of nodes correlated with the logical IP addresses, the storage unit being configured to accept accesses to the plurality of nodes by using the logical IP addresses as a destination via a network and to alter a setting of the logical IP addresses in the storage unit according to patterns of the accesses to the plurality of nodes from each of the plurality of clients;
wherein the plurality of nodes are accessed via the network by the plurality of clients by using the logical IP addresses assigned to the respective clients based on a correspondence between the assigned logical IP addresses and the plurality of nodes, the correspondence minimizing a processing cost of files accessed through the plurality of nodes, the logical IP addresses representing the storage unit to the plurality of clients,
the storage unit further includes an IP address conversion part that changes the correspondence dynamically by changing a destination of at least one of the logical IP addresses to one of real IP addresses of the plurality of nodes, and that transmits the changed correspondence to the network and informs the plurality of clients that the real IP address corresponding to the at least one of the logical IP addresses has been changed; and
wherein the storage unit further includes an assignment part that statically assigns the plurality of clients the respective logical IP addresses.

2. The storage load balancing system as claimed in claim 1, wherein the storage unit further includes a request part that allows each of the plurality of clients to transmit a file operation request to the corresponding one of the logical IP addresses.

3. The storage load balancing system as claimed in claim 1, wherein the storage unit further includes a distribution part that distributes the storage load among the plurality of nodes based on file access locality of the plurality of clients by assigning the plurality of clients the respective logical IP addresses of the storage unit.

4. The storage load balancing system as claimed in claim 1, wherein the storage unit further includes a statistical part that collects statistical information of accessed files with respect to each of the plurality of clients accessing the storage unit.

5. The storage load balancing system as claimed in claim 4, wherein the IP address conversion part changes the correspondence dynamically based on file access locality of the plurality of clients using the collected statistical information.

6. The storage load balancing system as claimed in claim 5, wherein the at least one of the logical IP addresses is directly switched to the real IP address of one of the plurality of nodes having high file access locality in accordance with the patterns of the accesses of the plurality of clients.

7. The storage load balancing system as claimed in claim 5, wherein when the change of the destination of the at least one of the logical IP addresses to the corresponding real IP address is required, a TCP/IP session whose operation is to be changed by the change is disconnected, and reconnected from a corresponding one of the plurality of clients.

8. The storage load balancing system as claimed in claim 1, wherein the IP address conversion part changes the correspondence dynamically by changing the destination of the at least one of the logical IP addresses to the one of the real IP addresses based on numbers of file access requests addressed to the logical IP addresses from the plurality of clients during a predetermined period.

* * * * *